(12) United States Patent
Hofmann et al.

(10) Patent No.: US 12,427,952 B2
(45) Date of Patent: Sep. 30, 2025

(54) CONCRETE PUMP AND METHOD FOR SUPPORTING A CONCRETE PUMP

(71) Applicant: Putzmeister Engineering GmbH, Aichtal (DE)

(72) Inventors: Wilfried Hofmann, Gründau-Rothenbergen (DE); Wolf-Michael Petzold, Aichtal (DE); Tobias Huth, Stuttgart (DE); Peter Mögle, Leinfelden-Echterdingen (DE)

(73) Assignee: Putzmeister Engineering GmbH, Aichtal (DE)

( * ) Notice: Subject to any disclaimer, the term of this patent is extended or adjusted under 35 U.S.C. 154(b) by 1049 days.

(21) Appl. No.: 17/430,599

(22) PCT Filed: Feb. 12, 2020

(86) PCT No.: PCT/EP2020/000041
§ 371 (c)(1),
(2) Date: Aug. 12, 2021

(87) PCT Pub. No.: WO2020/164794
PCT Pub. Date: Aug. 20, 2020

(65) Prior Publication Data
US 2022/0144221 A1 May 12, 2022

(30) Foreign Application Priority Data

Feb. 12, 2019 (DE) .................... 10 2019 103 439.6
May 23, 2019 (DE) .................... 10 2019 113 881.7

(51) Int. Cl.
*B60S 9/12* (2006.01)
*G05B 19/416* (2006.01)
(Continued)

(52) U.S. Cl.
CPC .............. *B60S 9/12* (2013.01); *G05B 19/416* (2013.01); *B66C 23/78* (2013.01);
(Continued)

(58) Field of Classification Search
CPC ...... B60S 9/12; B60S 9/00; B60S 9/10; B60S 9/02; B66C 23/78; B66C 23/80;
(Continued)

(56) References Cited

U.S. PATENT DOCUMENTS 6,170,681 B1 * 1/2001 Yoshimatsu .......... B66C 23/905
212/278
7,012,540 B2 * 3/2006 Petzold ................... B66C 23/90
340/685

(Continued)

FOREIGN PATENT DOCUMENTS

CN    000104088465 A    10/2014
CN    113412355          9/2021
(Continued)

OTHER PUBLICATIONS

PCT International Preliminary Report on Patentability for International application No. PCT/EP2020/000041 filed Feb. 12, 2020; Date of Issuance: Aug. 10, 2021; 12 pgs.
(Continued)

*Primary Examiner* — James M Dolak
(74) *Attorney, Agent, or Firm* — Alix, Yale & Ristas, LLP (57) ABSTRACT

The invention relates to a concrete pump, comprising: —a frame; —a supporting leg, the supporting leg having a supporting foot, the supporting foot being extensible relative to the supporting leg; and —a drive for driving a movement of the supporting leg relative to the frame. A camera image of a hazard zone around the supporting leg is produced by a monitoring sensor. The drive is controlled by means of a
(Continued)

remote control. The data information is transferred to the remote control via an interface. The invention also relates to a method for supporting a concrete pump. On the basis of the received data information, it can be determined, by means of the remote control, whether the movement of the supporting leg causes a hazard.

18 Claims, 5 Drawing Sheets

(51) Int. Cl.
  *B66C 23/78* (2006.01)
  *E04G 21/04* (2006.01)
(52) U.S. Cl.
  CPC ...... *E04G 21/0436* (2013.01); *E04G 21/0445* (2013.01); *G05B 2219/45102* (2013.01)
(58) Field of Classification Search
  CPC ....... B66C 23/88; B66C 23/90; B66C 23/905; B66C 13/00; B66C 13/46; B66C 13/18; B66C 15/00; B66C 15/06; B66C 15/065; G05B 19/416; G05B 2219/45102; E04G 21/0436; E04G 21/0445
  See application file for complete search history.

(56) References Cited

U.S. PATENT DOCUMENTS

| | | | | |
|---|---|---|---|---|
| 7,195,258 | B2* | 3/2007 | Petzold | B62D 61/125 |
| | | | | 280/6.155 |
| 7,909,059 | B2* | 3/2011 | Wehner | B66C 23/78 |
| | | | | 141/387 |
| 8,727,379 | B2* | 5/2014 | Goeggelmann | B66C 23/80 |
| | | | | 280/763.1 |
| 9,300,954 | B2* | 3/2016 | Tanizumi | G01B 11/245 |
| 9,365,398 | B2* | 6/2016 | Benton | B66C 23/905 |
| 10,526,804 | B2* | 1/2020 | Klein | B60S 9/10 |
| 10,544,012 | B2* | 1/2020 | Rudy | G06T 7/0004 |
| 11,905,146 | B2* | 2/2024 | Hayashi | B66C 13/46 |
| 12,012,310 | B2* | 6/2024 | Onishi | B66C 13/40 |
| 12,128,809 | B2* | 10/2024 | Kasten | F04B 15/02 |
| 12,168,594 | B2* | 12/2024 | Minami | B66C 13/22 |
| 12,172,871 | B2* | 12/2024 | Yoneda | B66C 13/46 |
| 12,172,872 | B2* | 12/2024 | Yamauchi | G05D 1/10 |
| 12,180,042 | B2* | 12/2024 | Minami | B66C 13/48 |
| 12,195,309 | B2* | 1/2025 | Tanii | B66C 23/905 |
| 12,221,327 | B2* | 2/2025 | Atherden | B66C 13/18 |
| 12,240,735 | B2* | 3/2025 | Hayashi | B66C 13/46 |
| 12,269,443 | B2* | 4/2025 | Näslund | B60S 9/02 |
| 12,283,179 | B2* | 4/2025 | Garceau | G05D 1/0016 |
| 2013/0079974 | A1* | 3/2013 | Stake | B66C 13/46 |
| | | | | 701/33.1 |
| 2016/0288776 | A1 | 10/2016 | Dominguez et al. | |
| 2017/0217737 | A1 | 8/2017 | Rudy et al. | |
| 2018/0022325 | A1 | 1/2018 | Garceau | |
| 2020/0140239 | A1* | 5/2020 | Schoonmaker | G01S 17/89 |

FOREIGN PATENT DOCUMENTS

| | | |
|---|---|---|
| DE | 3025554 A1 | 2/1982 |
| DE | 10320382 A1 | 12/2004 |
| DE | 102008007918 A1 | 8/2009 |
| DE | 102011012726 A1 | 9/2012 |
| DE | 102017130139 A1 | 6/2018 |
| EP | 2573039 A2 | 3/2013 |
| EP | 2722302 A1 | 4/2014 |
| EP | 3202701 A1 | 8/2017 |
| JP | 2009073248 A | 4/2009 |
| WO | 2005095256 A1 | 10/2005 |
| WO | 2010028938 A1 | 3/2010 |

OTHER PUBLICATIONS

PCT International Search Report and Written Opinion for International application No. PCT/EP2020/000041 filed Feb. 12, 2020; Date of Mailing: Jun. 17, 2020; 12 pgs.

* cited by examiner

CONCRETE PUMP AND METHOD FOR SUPPORTING A CONCRETE PUMP

BACKGROUND

The invention relates to a concrete pump and to a method for supporting a concrete pump. The concrete pump comprises a supporting leg and a drive for driving a movement of the supporting leg relative to the frame.

Concrete pumps are used to feed liquid concrete into a delivery pipe, so that the concrete moves along the delivery pipe to an exit end. The exit end of the delivery pipe is positioned in such a way that the concrete emerges at a desired position. Depending on the conditions on the construction site, the exit end of the delivery pipe may be arranged at a considerable distance from the concrete pump. So that the concrete pump is seated stably in spite of a delivery pipe extending out over a long distance, the concrete pump may be equipped with one or more supporting legs, which are retracted for transport of the concrete pump and deployed for use of the concrete pump, in order to support the concrete pump.

When retracting and deploying a supporting leg, great attention is required in order to prevent damage being caused by the movement of the supporting leg. Usually, the operating elements with which the movement of a supporting leg is controlled are arranged in such a way that the operator is located in the immediate vicinity of the hazard region. If the operator sees that the movement of the supporting leg is leading to danger, the supporting leg may be stopped. This procedure is made more difficult in the case of some known concrete pumps by the fact that the hazard region is behind the operator.

For the activity on the construction site, it may be inconvenient for the operator to have to move to the location of the concrete pump every time in order to move one of the supporting legs. If the operator is working at the location where the concrete emerges from the delivery pipe, for example, the route to the concrete pump may extend over a plurality of stories or be laborious for other reasons. The delays thereby incurred are undesirable.

SUMMARY OF THE INVENTION

The object of the invention is to provide a concrete pump and a method for supporting a concrete pump with improved user-friendliness. On the basis of the aforementioned prior art, the object is achieved by the features of the independent claims. Advantageous embodiments are specified in the dependent claims.

The concrete pump according to the invention comprises a remote control for actuating the supporting leg drive and a monitoring sensor for obtaining data information relating to the hazard region of the supporting leg. The data information is transmitted to the remote control by means of an interface.

Through the actuation of the supporting leg by remote control, the operator is spared going to the location of the concrete pump merely to operate the supporting leg. If the data information relating to the hazard region of the supporting leg is available at the remote control, the operator may decide with the aid of the data information whether danger will be caused by the movement of the supporting leg.

The hazard region of the supporting leg refers to the region in which the supporting leg can move between a retracted state and a fully deployed state. The monitoring sensor is preferably arranged in such a way as to allow a good overview of the hazard region of the supporting leg. For example, the monitoring sensor may be connected to the frame of the concrete pump or to the supporting leg. A monitoring sensor connected to the supporting leg may, for example, be arranged in a distal section of the supporting leg and allow data information in one or more of the movement directions of the supporting leg.

The monitoring sensor may be formed as a contactless sensor, so that a hazard can already be detected before it has occurred. In contrast thereto, a contact-based monitoring sensor would only react when the supporting leg has already come in contact with an obstacle. For example, a camera for the image visible to a person, a RADAR sensor, a LIDAR sensor, an infrared camera, an ultrasound sensor or the like may be envisioned as a contactless monitoring sensor.

The concrete pump may comprise an evaluation module, to which the data information from the monitoring sensor is supplied. The evaluation module may determine derived data information from the incoming data information. The derived data information may be configured in such a way that it is more readily comprehensible to a person than the direct measurements of the monitoring sensor. In the scope of the invention, for the transmission of data information to the remote control it is sufficient for derived data information to be transmitted to the remote control.

In the evaluation module, the incoming data information may be reduced to binary data information. The content of the binary data information may, for example, be a statement as to whether or not a hazardous situation exists. An advantage of binary data information is that it can be represented more easily on the remote control. For example, the remote control may comprise a monitor light which shines green when there is no hazard and which shines red when the evaluation module has established a hazardous situation. Another possibility might be to indicate a hazardous situation by a warning sound.

In the case of binary data information, the user receives only the information as to whether there is a hazardous situation. In order to establish what type of hazardous situation there is, the user must use other information paths. For example, a user may move to the location of the concrete pump in order to form an opinion in situ. In one embodiment, the transmitted data information relating to the concrete pump contains information about the type of hazardous situation. For example, distinction may be made between a serious hazardous situation, in which the supporting leg must be stopped immediately, and a routine hazardous situation in which the supporting leg may continue to be moved carefully.

It is also possible for the data information transmitted to the remote control to comprise image information. The image may be a true-to-life image, for example if image data recorded using a camera are transmitted to the remote control so that the same image that the camera sees can be represented on the remote control. The image information may also be derived image information, for example by the region in which the monitoring sensor has determined a hazard being indicated in a schematic view of the concrete pump.

The monitoring sensor may be arranged at a position which is elevated relative to the supporting leg, so that the hazard region on both sides of the supporting leg can be viewed using the monitoring sensor. In one embodiment, the camera is fitted on a boom that carries the delivery pipe.

The monitoring sensor may be swivelably suspended, so that the region from which the monitoring sensor can obtain data information is adjustable. For example, the monitoring sensor may be adjustable in such a way that in a first state it monitors a first supporting leg, and in a second state it monitors a second supporting leg. If the monitoring sensor is suspended from an element of the concrete pump which is itself moveable relative to the supporting legs, the camera may be swiveled in order to compensate for movement of the element. The moveable element may, for example, be the boom of the concrete pump. In one embodiment, the alignment of the monitoring sensor may be actuated by means of the remote control. In addition or as an alternative thereto, the camera may be configured in such a way that it is automatically aligned with the same supporting leg as is being actuated using the remote control.

Depending on the setting of the supporting leg, it may happen that a part of the hazard region is concealed by the supporting leg, so that the data information obtained using the monitoring sensor is incomplete. In order to allow a good overview of the hazard region, the concrete pump may be equipped with a multiplicity of monitoring sensors. The multiplicity of monitoring sensors may be arranged in such a way that a second monitoring sensor views a part of the hazard region that is concealed from the first monitoring sensor in a particular setting of the supporting leg.

In one embodiment, a first monitoring sensor and a second monitoring sensor are arranged on two sides of a plane which, in the fully deployed state of the supporting leg, extends between a proximal end and a distal end of the supporting leg. The plane may, for example, be a horizontal plane or a vertical plane. It is also possible for a first monitoring sensor to be connected to the frame of the concrete pump and for a second monitoring sensor to be connected to the supporting leg.

The remote control is distinguished in that it is not fitted on the concrete pump in a fixed position, but that the remote control may be used at different locations relative to the concrete pump, depending on the respective situation. The remote control may be embodied as a portable operating unit, which is dimensioned in such a way that a person can carry the portable operating unit with them. The remote control may comprise an operating element with which a movement of the supporting leg is actuated. The remote control may be configured to actuate further functions of the concrete pump, for example switching a pump device on and off or moving the boom of the concrete pump.

The remote control may comprise an indicator device in order to represent to the user the data information received via the interface. The indicator device may comprise a visual and/or acoustic indicator. The indicator device may be configured to indicate predetermined information states, as is the case for example with a warning light which can shine in different colors.

In one embodiment, the remote control comprises a display for representing image information. The display may be configured to directly reproduce an image recorded using a camera. It is also possible to represent on the display an image in which data information obtained using the monitoring sensor may be added.

The display may be subdivided so that a plurality of images can be represented simultaneously. For example, camera images of a multiplicity of cameras may be represented simultaneously. In addition or as an alternative thereto, the remote control may be set up in such a way that the camera images of a plurality of cameras are represented in a chronological sequence, for example alternately one after the other. A change between the camera images of different cameras may take place automatically, for example after a predetermined length of time has elapsed. It is also possible to initiate the change to the camera image of another camera by an input of the operator. Representing camera images in a chronological sequence may, in particular, be recommendable if the display is not large enough to be able to represent the relevant images simultaneously.

The remote control may be accommodated inside a unitary casing. It is also possible to distribute the functions of the remote control over a plurality of components, so that for example the operating elements are accommodated in a different casing than the indicator device.

The interface to the remote control may be embodied as a wireless interface, so that data may for example be transmitted by radio. A cable-based interface is also possible. The interface is preferably configured in such a way that the data information can be transmitted to the remote control in real time, so that hazards caused by the supporting leg can be detected promptly. The interface can be configured in such a way that new data information is transmitted to the remote control in brief clocking cycles. In the case of pictorial representation of the data information, it is then possible to represent a movement process. The interface may be set up in such a way that further information relating to the state of the concrete pump can be transmitted to the remote control. The interface may be configured as a bidirectional interface, so that control instructions can also be transmitted from the remote control to the concrete pump.

The operating element for actuating the supporting leg may be equipped with a touch function, so that the supporting leg is moved only if the operating element is being held and that the supporting leg automatically comes to a stop if the operating element is released. In addition or as an alternative thereto, the indicator device may also be equipped with gaze detection, so that the supporting leg can be moved only if the operator's gaze is directed at the indicator device.

The concrete pump may comprise a multiplicity of supporting legs, so that the concrete pump can be supported in different directions. The concrete pump may be set up in such a way that the supporting legs can only be moved individually, so that all the other supporting legs are stationary when one of the supporting legs is in movement. The remote control may comprise a selector switch, with which the supporting leg to be actuated can be selected.

The supporting leg comprises a supporting foot, which is arranged at a distal end of the supporting leg. When the supporting leg is deployed, the distance between the supporting foot and the frame of the concrete pump increases. The supporting leg may, for example, be deployed with a swiveling movement and/or with a linear movement. The retraction of the supporting leg takes place in the opposite direction to the deployment. The concrete pump may comprise a boom, a proximal end of the boom being connected to the frame of the concrete pump. The boom may be mounted rotatably about a vertical axis relative to the frame. In a deployed state of the supporting leg, the distance between the vertical axis of the boom and the supporting foot of the supporting leg may be greater than in the retracted state of the supporting leg. The distance is considered in a horizontal plane. An extent of the frame of the concrete pump in a longitudinal direction may be greater than a transverse extent of the frame perpendicular to the longitudinal direction. If a first imaginary line extends in the longitudinal direction through the frame and a second imaginary line extends in a longitudinal direction through the supporting foot, a distance between the first imaginary line and the second imaginary line in a deployed state of the supporting leg may be greater than in a retracted state of the supporting leg. The longitudinal direction and transverse extent of the frame refer to a normal operating state of the concrete pump and run substantially in a horizontal plane.

In order to support the concrete pump, the supporting foot may be deployed relative to the supporting leg. To this end, the supporting foot may initially be lowered until it rests on the ground. By further deployment of the supporting foot, the concrete pump may be entirely or partially raised. The drive for driving the supporting leg and/or the supporting foot may, for example, be an electrical drive or a hydraulic drive. The hydraulic drive may comprise a pressure sensor, which may in particular be configured to detect an increase in the hydraulic pressure.

The pressure sensor may, for example, be used to detect a ground contact of the supporting foot. The sensor may monitor the pressure in the hydraulic system and evaluate a rapid pressure increase as a sign of ground contact of the supporting foot. Information relating to the bearing capacity of the ground may be derived from the profile of the pressure increase. If the supporting foot sinks into the ground, the pressure increase is less steep than if the supporting foot is placed on hard ground.

In addition or as an alternative thereto, the concrete pump may be equipped with an inclination sensor, in which case the inclination sensor may in particular be configured to determine the inclination of the frame of the concrete pump relative to the horizontal. With such an inclination sensor, it is also possible to establish whether the supporting foot has ground contact. If this is the case, the inclination of the frame will change with further deployment of the supporting foot, otherwise the inclination remains constant.

One or more displacement sensors, with which it is established whether the distance of the concrete pump from the ground changes, are also possible. If a supporting foot has ground contact, such a distance change takes place with further deployment of the supporting foot, otherwise the distance remains constant. The aforementioned sensors may be used individually or in combination in order to obtain information relating to ground contact of the supporting foot, or to level the concrete pump.

When supporting the concrete pump, all the supporting legs may initially be deployed until the supporting feet have the appropriate distance from the frame of the concrete pump. Subsequently, the supporting feet may be deployed relative to their respective supporting legs until the supporting feet have ground contact. Starting from this state, the concrete pump may be leveled, i.e. aligned parallel with a horizontal plane. In this case, the supporting feet may be deployed further until the concrete pump is fully raised from the ground and then supported only by the supporting feet. During the leveling, it may be advantageous for all the supporting feet to be deployed simultaneously. In this way, the concrete pump may be raised without a tilting movement simultaneously taking place.

The leveling may take place automatically under the supervision of a control unit. The control unit may be configured to evaluate a signal of an inclination sensor and to derive control instructions for the deployment of the supporting feet therefrom. The supporting feet may be deployed according to the control instructions determined by the control unit.

It is also possible for the movement of the supporting legs to take place automatically under the supervision of a control unit. One or more predetermined supporting states may be stored in the control unit, and the control unit may be configured to actuate the supporting legs in such a way that they occupy a setting appropriate for the relevant supporting state. Subsequently, in a likewise automatic process, the supporting feet may be deployed and the concrete pump may optionally be leveled. Conversely, the retraction of the supporting legs and/or supporting feet may take place in such an automatic process. The control unit may be actuated from the remote control in a corresponding way, in which case the control unit may be set up in such a way that an operating element must be engaged continuously while the automatic process takes place. If the operating element is released, the automatic process may be terminated. The control unit may also be configured to make a selection between the different predetermined supporting states. In this embodiment, the remote control is configured, according to a single operator input, both to move the supporting leg relative to the frame and to move a supporting foot relative to the supporting leg.

The invention furthermore relates to a concrete pump in which an instruction sequence for actuating the supporting legs is stored in a control unit. The instruction sequence may comprise steps by which the supporting legs are deployed starting from the retracted state and/or by which the concrete pump is supported. In addition or as an alternative thereto, the instruction sequence may comprise steps by which the concrete pump is leveled. In addition or as an alternative thereto, the instruction sequence may comprise steps by which the supporting legs are retracted starting from a deployed state. The control unit may be set up in such a way that the steps are carried out automatically after an initial initiation signal, i.e. without further intermediate inputs of a user. The invention furthermore relates to an associated method for supporting or aligning a concrete pump. A concrete pump and a method according to this embodiment have independent inventive content regardless of whether the concrete pump comprises a remote control and whether data information is transmitted to the remote control.

The concrete pump may be set up in such a way that the data information obtained using the monitoring sensor is transmitted to the control unit. The deployment process may be continued automatically so long as the monitoring sensor determines no hazard. The control unit may be configured to terminate the deployment process if the monitoring sensor establishes a hazardous situation. The control unit may be configured to request an input of a user before the process is continued. The user may make an input and confirm the resumption after they have ascertained that there is no longer any hazard.

In one embodiment, the concrete pump is configured as a mobile concrete pump. In this case, the frame of the concrete pump may be formed as a chassis or connected to a chassis. A drive motor may be provided, by which a transport movement of the concrete pump is driven. The concrete pump according to the invention may be equipped with four supporting feet.

The concrete pump according to the invention may be equipped with a system for automatic hazard detection. The system may be set up in such a way that a movement of the supporting leg is automatically brought to a stop if the system detects a hazard. The stopping of the movement is intended in particular to take place irrespective of whether the operator detects the hazard.

The system for hazard detection may comprise a collision sensor. The collision sensor may emit signals in the direction in which the supporting leg is moving. If the signals impinge on an obstacle, they are reflected and travel back to the collision sensor. From the time of flight of the signals, the collision sensor may deduce the distance to the obstacle so that the supporting leg can be brought to a stop promptly if necessary. The signals may, for example, be ultrasound, RADAR and/or LIDAR signals. In one embodiment, one or more of the monitoring sensors are used as a collision sensor.

In addition or as an alternative thereto, the collision sensor may carry out an automatic image evaluation. In this way, obstacles in an image recorded using the camera may be detected. It is also possible to monitor pressure in the hydraulic system, by which the supporting leg is moved, using a pressure sensor. If the pressure increases unexpectedly, this may be evaluated as an indication that the supporting leg has touched an obstacle. The movement of the supporting leg may be brought to a stop.

In particular, it is necessary to avoid a person in the hazard region being struck by the supporting leg. In addition to the hazard detection, optical and/or acoustic warning signals may be emitted as soon as a supporting leg is in movement. A person who perceives such a warning signal may move out from the hazard region before harm occurs.

A concrete pump and a method for supporting a concrete pump with such a system for automatic hazard detection have independent inventive content regardless of whether the supporting leg is actuated using a remote control and whether a camera image of a hazard region of the supporting leg is recorded.

The invention furthermore relates to a method for supporting a concrete pump. In the method, a supporting leg is moved relative to a frame of the concrete pump using a drive. The drive is actuated by means of a remote control. The remote control is set up in such a way that actuation of the drive is allowed only if an indicator device of the remote control is active so that data information obtained using a monitoring sensor from the hazard region of the supporting leg is indicated using the indicator device. In particular, the remote control may be set up in such a way that actuation of the drive is allowed only if a camera image of the hazard region of the supporting leg is being indicated on a display of the remote control.

The method according to the invention may be refined with further features that are described in connection with the concrete pump. The concrete pump according to the invention may be refined with further features that are described in connection with the method.

BRIEF DESCRIPTION OF THE DRAWINGS

The invention will be described by way of example below with the aid of advantageous embodiments with reference to the appended drawings, in which.

DETAILED DESCRIPTION

Figure 1:
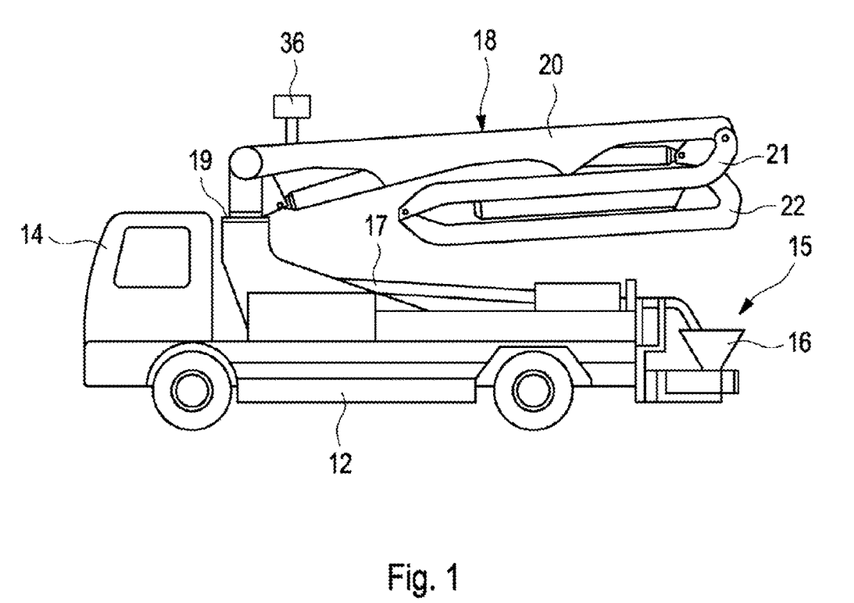
FIG. 1: shows a concrete pump vehicle having a boom in the folded state.
Figure 2:
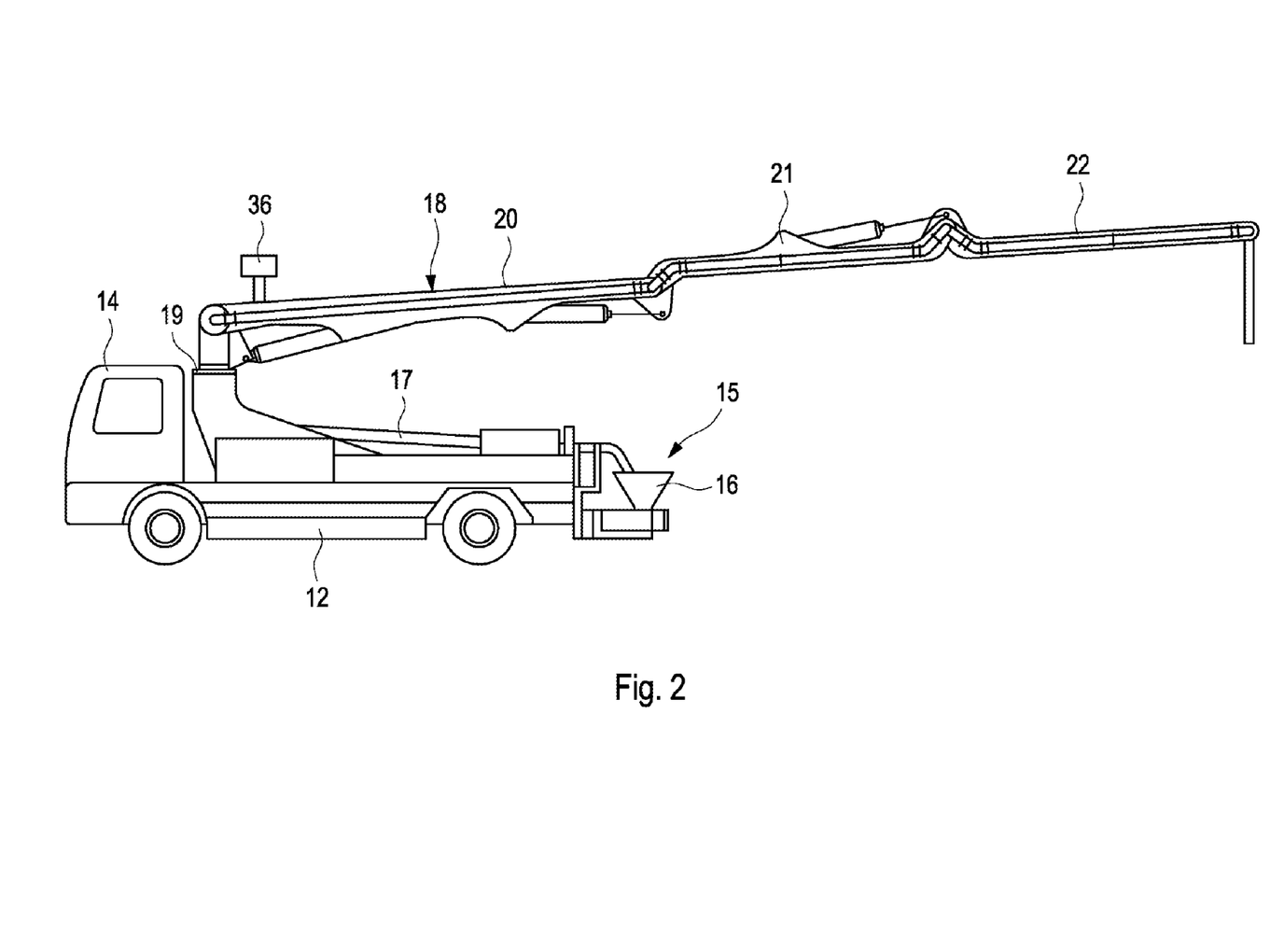
FIG. 2: shows the concrete pump vehicle of FIG. 1 with the boom unfolded.

A truck 14 shown in FIG. 1 is equipped with a concrete pump 15, which delivers liquid concrete from a prefill container 16 through a delivery pipe 17. The delivery pipe 17 extends along a boom 18, which is mounted rotatably on a slewing ring 19. The boom 18 comprises three boom segments 20, 21, 22, which are connected to one another in an articulated fashion. By the boom segments 20, 21, 22 being swiveled relative to one another by means of the articulation, the boom 18 can change between a folded state (FIG. 1) and an unfolded state (FIG. 2). The delivery pipe 17 extends to beyond the distal end of the third boom segment 22, so that the liquid concrete can be poured out in a region distant from the concrete pump 15.

Figure 3:
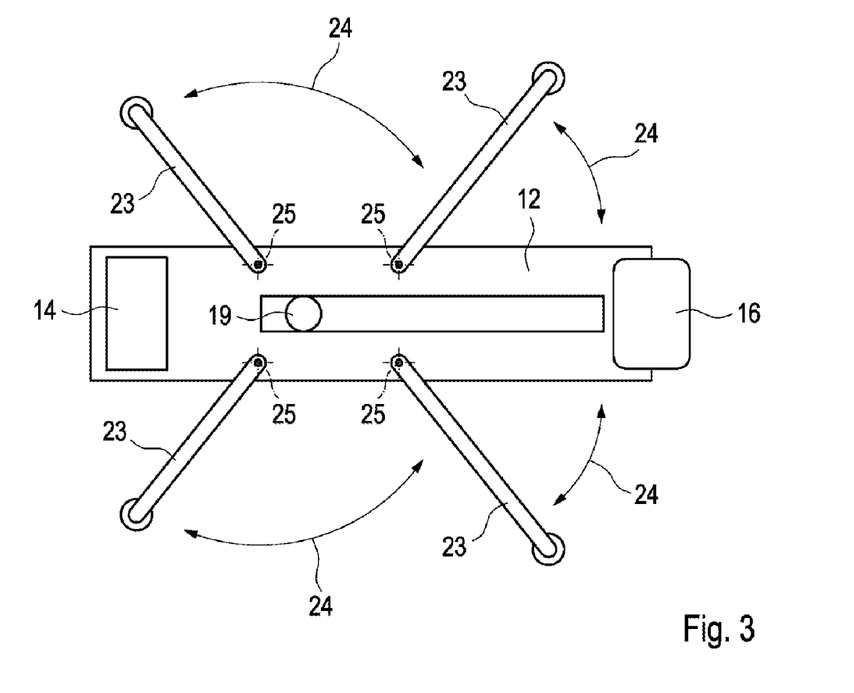
FIG. 3: shows a schematic view from above of a concrete pump vehicle according to the invention.

If the boom 18 is swiveled to the side starting from the state shown in FIG. 2, a considerable tilting moment acts on the truck 14. So that the truck 14 does not tip over, four supporting legs 23 are deployed before unfolding the boom 18. In FIG. 3, the fully deployed supporting legs 23 are shown in a view from above. In the retracted state, the supporting legs 23 extend parallel to a longitudinal axis of the truck 14. The hazard region 24 of a supporting leg 23, due to a swiveling movement, is indicated by arrows. The vertically aligned axis 25 of the swiveling movement respectively lies at the proximal end 30 of the supporting legs 23.

Figure 4:
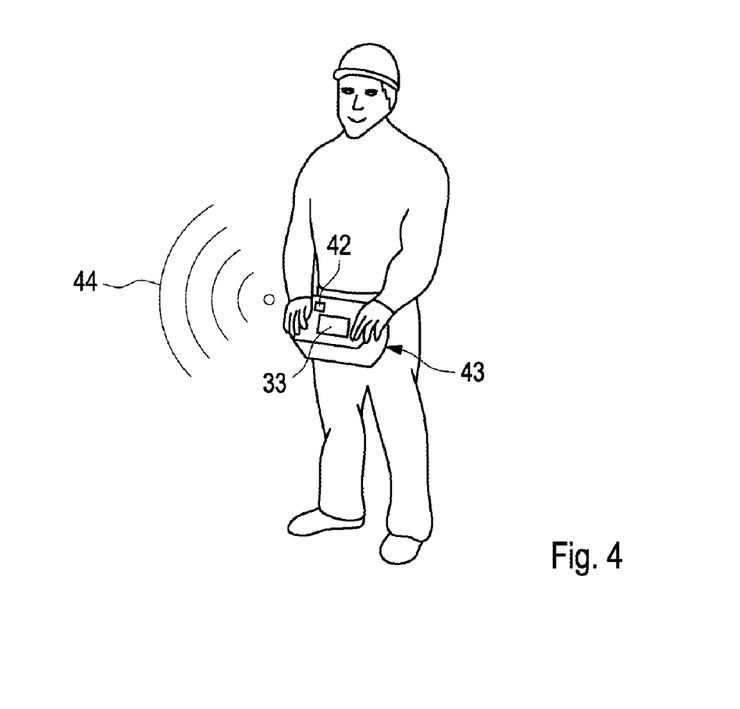
FIG. 4: shows an operator with a remote control for the concrete pump according to the invention.

Each supporting leg 23 is assigned a hydraulic motor 46, by which the swiveling movement between the retracted state and the deployed state is driven. The motors 46 are actuated using a remote control 43. The remote control 43 is configured in such a way that an operator can carry it with them. Between the remote control 43 and a control unit 38 of the concrete pump, there is a bidirectional radio link 44, which forms an interface in the sense of the invention.

Figure 5:
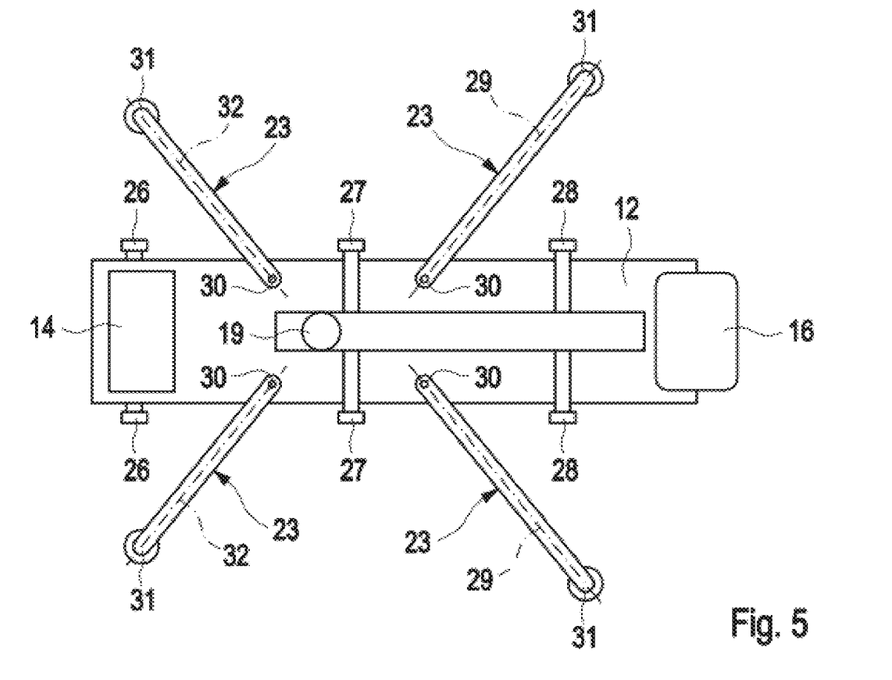
FIG. 5, 6: show the view of FIG. 3 with further details.

In the embodiment according to FIG. 5, three outwardly looking cameras 26, 27, 28, with which the swiveling region 24 of the supporting legs 23 can be monitored, are arranged on each side of the truck 14. The cameras 26, 27, 28 form monitoring sensors in the sense of the invention. For the rear supporting legs 23, cameras 27, 28 are arranged on two sides of a vertical plane 29 which, in the deployed state of the rear supporting leg 23, extends between the proximal end 30 and the distal end 31 of the supporting leg 23. The swiveling region 24 of the rear supporting leg 23 on both sides of the supporting leg 23 can be monitored using the cameras 27, 28.

For the front supporting legs 23, cameras 26, 27 are arranged on two sides of a vertical plane 32 which, in the deployed state of the rear supporting leg 23, extends between the proximal end 30 and the distal end 31 of the supporting leg 23. The swiveling region 24 of the front supporting leg 23 on both sides of the supporting leg 23 can be monitored using the cameras 26, 27.

The remote control 43 is set up in such a way that one and only one supporting leg 23 can be set in movement at any time. The other three supporting legs 23 are stationary while the one supporting leg 23 moves. The remote control 43 comprises an operating element, with which the actuation of one of the supporting legs 23 can be activated. With the engagement of this operating element, the two cameras 26, 27 or 27, 28 assigned to the relevant supporting leg 23 are set in operation. The camera images recorded using the cameras are transmitted at short time intervals by radio to the remote control 43 and indicated on a display 33 of the remote control. The display 33 is in two parts, so that the camera image of the first camera can be represented in a left half and the camera image of the second camera can be indicated in a right half of the display 33. The operator may monitor the hazard region 24 on both sides of the supporting leg 23 by looking at the display 33.

After the camera images can be seen on the display 33, the actuation of the associated supporting leg 23 is enabled. The operator can set the supporting leg 23 in movement by means of the remote control 43, while ensuring by observation of the display 33 that danger does not occur because of the movement of the supporting leg 23. If danger does occur, the movement of the supporting leg 23 may be brought to a stop immediately by means of the remote control 43.

When the relevant supporting leg 23 has been swiveled into the desired position, the actuation of the next supporting leg 23 may be activated and this supporting leg 23 may be swiveled in a corresponding way, until all the supporting legs 23 occupy the desired position.

Figure 7:
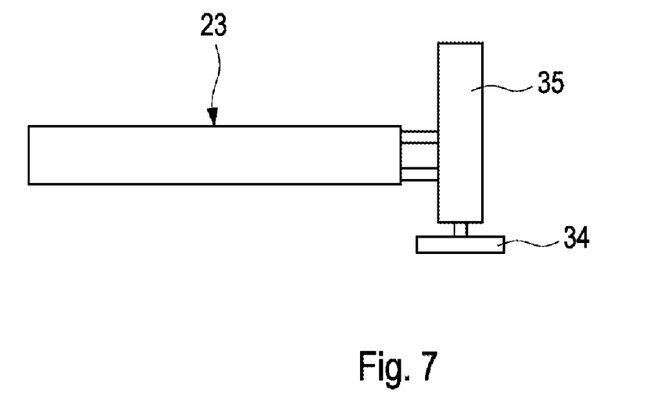
FIG. 7: shows a supporting leg of a concrete pump according to the invention in a first state.
Figure 8:
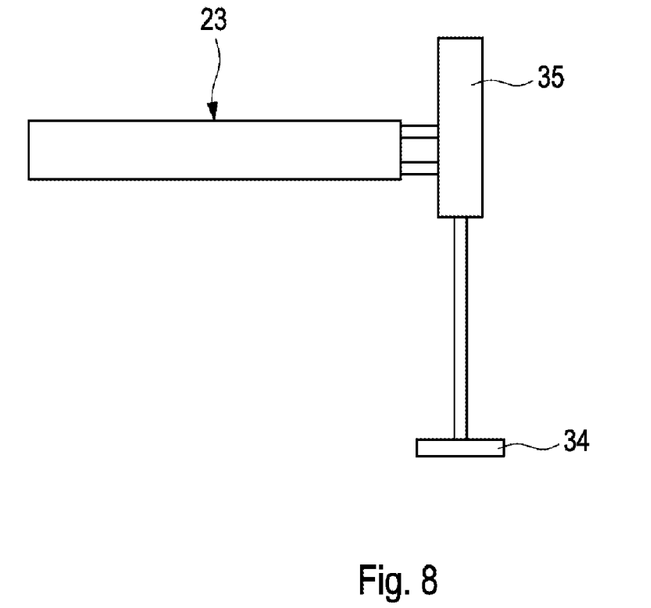
FIG. 8: shows the supporting leg of FIG. 7 in a second state.

As shown in FIGS. 7 and 8, each of the supporting legs 23 comprises a supporting foot 34 which can be deployed downward using a hydraulic cylinder 35. When the supporting legs 23 have been swiveled into the desired position, the supporting feet 34 may be actuated individually or in groups by means of the remote control 43 and deployed downward. If the supporting feet 34 are deployed further after reaching ground contact, the truck 14 is raised so that it is then only supported on the ground by means of the supporting feet 34. In this case, the operator actuates the hydraulic cylinders 35 in such a way that the truck 14 is leveled, i.e. horizontally aligned. Once this process has been completed, the truck 14 has stable support and the boom 18 can be swiveled to the side without hazard.

In the embodiment according to FIGS. 1 and 2, a camera 36, which can be rotated relative to the boom 18 and swiveled up and down, is arranged on the boom 18. The viewing direction of the camera 36 may be adjusted by means of the remote control 43 so that the hazard region 24 of one or more supporting legs 23 can be viewed. The image of the camera 36 is transmitted to the display 33 of the remote control 43. The camera 36 may be used on its own or together with one or more of the cameras 26, 27, 28 for monitoring the hazard regions 24 of the supporting legs 23.

Figure 6:
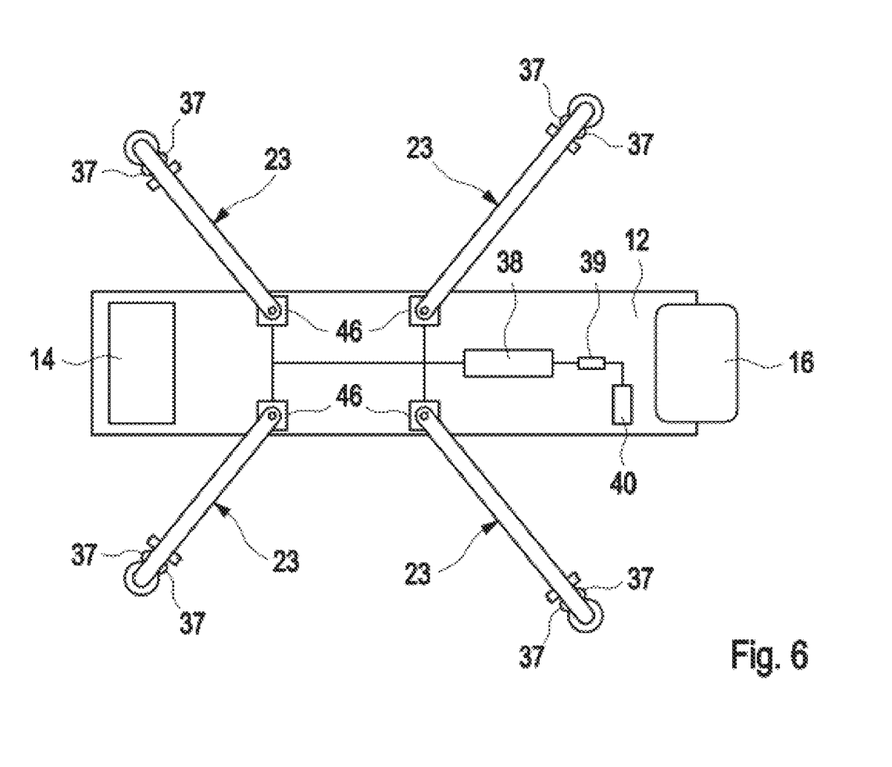

FIG. 6 shows an embodiment in which each of the supporting legs 23 is equipped with two LIDAR sensors 37 that are aligned in the two opposite swiveling directions of the supporting leg 23. The measurement values of the LIDAR sensors 37 are fed to a control unit 38. An evaluation module 47 connected to the control unit 38 evaluates the measurement values of the LIDAR sensors and establishes whether the measurement values give an indication of an obstacle in the swiveling region of the supporting leg 23. The result of the evaluation is sent continuously as data information by radio to the remote control 43. On the remote control, the data information is indicated by a monitor light shining green if there is no hazard and shining red if the measurement values of the LIDAR sensors give an indication of a hazard. The operator can bring the supporting arms 23 to a halt as soon as the monitor light shines red.

Depending on the seriousness of the hazardous situation, the LIDAR sensor 37 may additionally send a control signal to a control unit 38 which controls the operation of the motors 26. Immediately after receiving the control signal, the control unit 38 brings the motor 26 of the relevant supporting leg 23 to a stop. In this way, collisions may be avoided regardless of whether the operator consciously notices the indications on the remote control 43.

The control unit 38 is furthermore connected to a sensor 39 which monitors the pressure in the hydraulic system. An unexpected increase in the pressure is evaluated as an indication that the supporting leg 23 has touched an obstacle and therefore cannot move further. The sensor 39 reports the pressure increase resulting therefrom to the control unit 38 so that the control unit 38 can stop the motor 26. In this way, it is possible to prevent the damage following the first collision from being further exacerbated.

When all the supporting legs 23 have been brought into the desired position, deployment of the supporting feet 34 takes place in an automatic process under the supervision of the control unit 38. The control unit 38 simultaneously gives all the hydraulic cylinders 35 the instruction to deploy the supporting feet 34. When a supporting foot 34 touches the ground it is detected using the pressure sensor 39. The relevant hydraulic cylinder 35 is initially brought to a halt by the control unit 38. Once all the supporting feet 34 have ground contact, the supporting feet 34 may be deployed individually a little further. From the profile of the pressure change in the hydraulic system, an indication may be derived as to whether the ground on which the relevant supporting foot 34 is being supported is capable of bearing a load. If this is the case, the supporting feet 34 may be deployed further until the truck 14 is raised from the ground.

From an inclination sensor 40, the control unit 38 receives information relating to the direction in which the truck 14 is inclined. Taking into account the measurement values of the inclination sensor 40, the control unit 38 may actuate the hydraulic cylinders 35 in such a way that the truck 14 comes into a horizontally aligned setting.

The invention claimed is:

1. A concrete pump comprising:
    a frame;
    a supporting leg connected to the frame, the supporting leg comprising a supporting foot deployable relative to the supporting leg;
    a drive for driving a movement of the supporting leg relative to the frame;
    at least one monitoring sensor mounted to a distal section of the supporting leg and configured to obtain data information relating to a hazard region of the supporting leg;
    a remote control for actuating the drive, said remote control usable at different locations relative to the concrete pump; and
    an interface for transmitting the data information to the remote control,
    wherein the data information relating to the hazard region of the supporting leg is transmitted to the remote control, allowing an operator of the concrete pump at the remote control to decide whether danger will be caused by movement of the supporting leg between a retracted state and a deployed state.

2. The concrete pump of claim 1, wherein the remote control is equipped with an indicator unit for indicating the data information received.

3. The concrete pump of claim 1, wherein the at least one monitoring sensor comprises monitoring sensors connected to the frame or to a boom of the concrete pump.

4. The concrete pump of claim 1, wherein the at least one monitoring sensor comprises a plurality of monitoring sensors.

5. The concrete pump of claim 1, wherein the remote control is formed as a portable operating unit.

6. The concrete pump of claim 1, wherein the remote control comprises an operating element with which a movement of the supporting leg is actuated.

7. The concrete pump of claim 1, wherein said at least one monitoring sensor includes a camera and an image from the camera is transmitted to the remote control via the interface.

8. The concrete pump of claim 7, wherein the remote control comprises a display for indicating the camera image.

9. The concrete pump of claim 8, wherein the display is subdivided so that camera images of a multiplicity of cameras can be represented simultaneously.

10. The concrete pump of claim 8, wherein the remote control is configured to represent camera images of a multiplicity of cameras in a chronological sequence.

11. The concrete pump of claim 1, wherein the interface to the remote control is embodied as a wireless interface.

12. The concrete pump of claim 1, wherein the monitoring sensor comprises a collision sensor, a movement of the supporting leg being automatically brought to a stop if the collision sensor determines an impending collision.

13. The concrete pump of claim 11, wherein the remote control is configured according to a single operator input, both to move the supporting leg relative to the frame and to move the supporting foot relative to the supporting leg.

14. The concrete pump of claim 1, comprising:
   a boom mounted to the frame and rotatable relative to the frame about a vertical axis,
   wherein movement of the supporting leg relative to the frame includes deployment of the supporting leg with a swiveling movement or with a linear movement, a horizontal distance between the vertical axis and the supporting foot increasing when the supporting leg is deployed.

15. The concrete pump of claim 1, wherein the monitoring sensor is a contactless monitoring sensor selected from the group comprising a camera for the image visible to a person, a RADAR sensor, a LIDAR sensor, an infrared camera, and an ultrasound sensor.

16. A method for supporting a concrete pump comprising a supporting leg moveable relative to a frame of the concrete pump between a retracted position and a deployed state by a drive, said supporting leg having a supporting foot deployable relative to the supporting leg, said method comprising:
   mounting a monitoring sensor to the supporting leg so that a relative position of the monitoring sensor and the supporting leg does not change during movement of the supporting leg;
   monitoring a hazard region of the supporting leg using the monitoring sensor to collect data information relating to a hazard condition in one or more movement directions of the supporting leg;
   transmitting information relating to the hazard condition to a remote control configured as a portable operating unit from which the drive of the supporting leg can be actuated;
   configuring the remote control to comprise an indicator device indicating the data information from the hazard region of the supporting leg; and
   allowing actuation of the drive by a user of the remote control only if the indicator device is actively indicating the data information from the hazard region of the supporting leg.

17. The method of claim 16, comprising:
   evaluating the data information from the monitoring sensor to determine derived data information more readily comprehensible to the user than direct measurements of the monitoring sensor.

18. The method of claim 17, wherein the derived data information is a statement whether or not a hazard situation exists in the hazard region of the supporting leg.

* * * * *